United States Patent [19]

van der Lely

[11] 4,342,365
[45] Aug. 3, 1982

[54] SOIL CRUMBLING ROLLERS

[76] Inventor: Cornelis van der Lely, 7, Brüschenrain, Zug, Switzerland

[21] Appl. No.: 819,476

[22] Filed: Jul. 27, 1977

[30] Foreign Application Priority Data

Aug. 3, 1976 [NL] Netherlands ................. 7608610

[51] Int. Cl.³ ............................................ A01B 29/04
[52] U.S. Cl. ...................................... 172/552; 172/68
[58] Field of Search ................. 172/68, 552, 121, 553, 172/555, 540, 59, 540; 56/299, 220, 221, 222; 301/52

[56] References Cited

U.S. PATENT DOCUMENTS

| 1,121,243 | 12/1914 | Gladding | 301/52 |
| 1,141,765 | 6/1915 | Bullard | 172/555 |
| 3,132,460 | 5/1964 | Spindler | 56/221 |
| 3,887,014 | 6/1975 | Lely | 172/59 |
| 3,897,830 | 8/1975 | Lely | 172/59 |
| 3,899,030 | 8/1975 | Lely et al. | 172/59 |
| 3,910,356 | 10/1975 | Lely | 172/59 |

FOREIGN PATENT DOCUMENTS

| 233885 | 6/1964 | Austria | 172/552 |
| 1187840 | 2/1965 | Fed. Rep. of Germany | 172/552 |
| 2112309 | 10/1972 | Fed. Rep. of Germany | 172/540 |

Primary Examiner—Richard J. Johnson
Attorney, Agent, or Firm—Mason, Mason and Albright

[57] ABSTRACT

A roller for crumbling soil has round support plates arranged at spaced apart intervals along the axis of rotation of the roller. The plates are profiled with a saw-tooth configuration having folds and projections. Elongated elements, preferably bars, are fixed to the projections to extend generally parallel to the axis of rotation. The elements are T-shaped in cross section with the crossbar and upright of each T being connected to the peripheries of the plates leaving a space. The roller can be assembled by securing cross struts to the end plates, and passing the struts through the spaces. The intermediate plates are loosely held in position with the struts that bear on the peripheries of those plates. Thereafter, the bars can be welded or otherwise fixed to the plates' peripheries.

15 Claims, 10 Drawing Figures

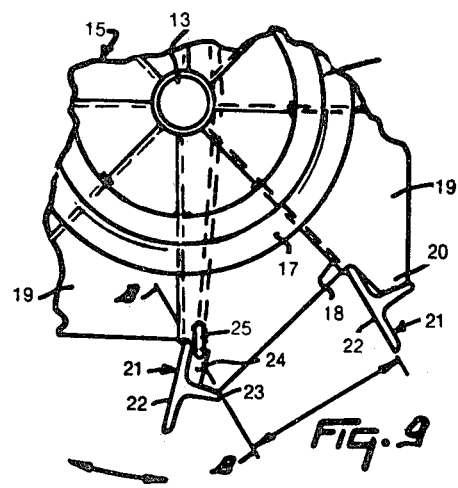
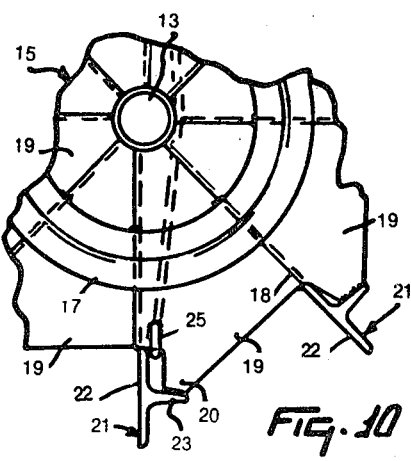

SOIL CRUMBLING ROLLERS

This invention relates to soil crumbling rollers for agricultural use, such rollers being of the kind which comprise a plurality of crumbling elements that are elongate in the direction of the intended axis of rotation of the roller.

According to one aspect of the invention, there is provided a soil crumbling roller of the kind set forth, wherein at least some of said elements are in the form of fixedly mounted bars of T-shaped cross-section.

Figure 1:
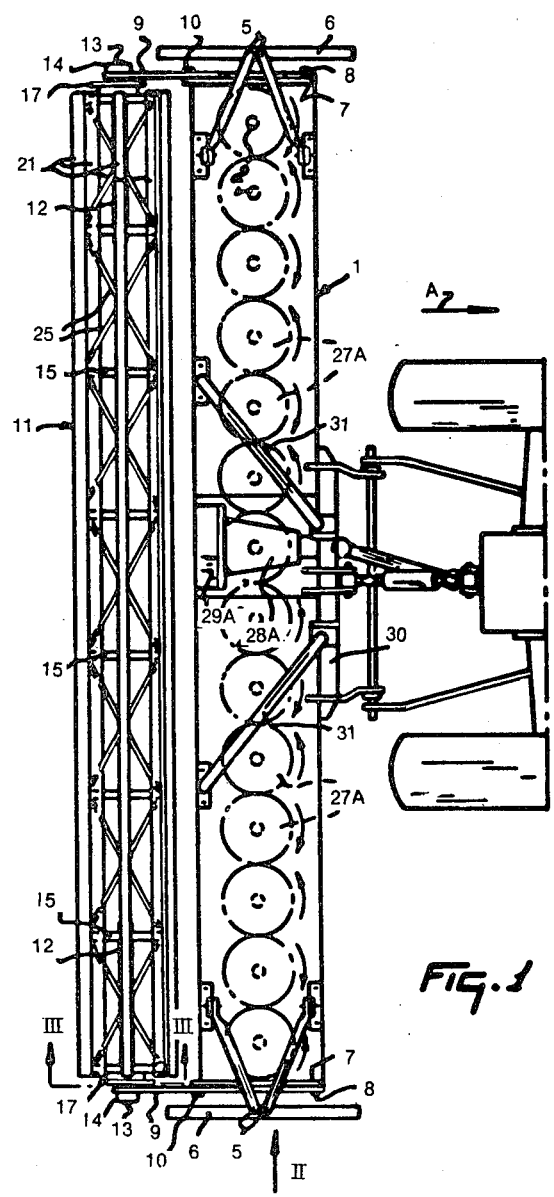
Figure 2:
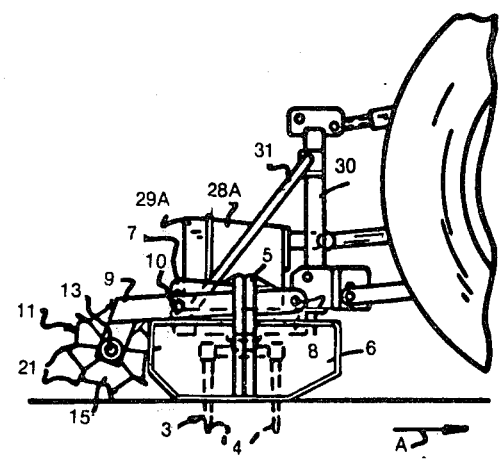
Figure 3:
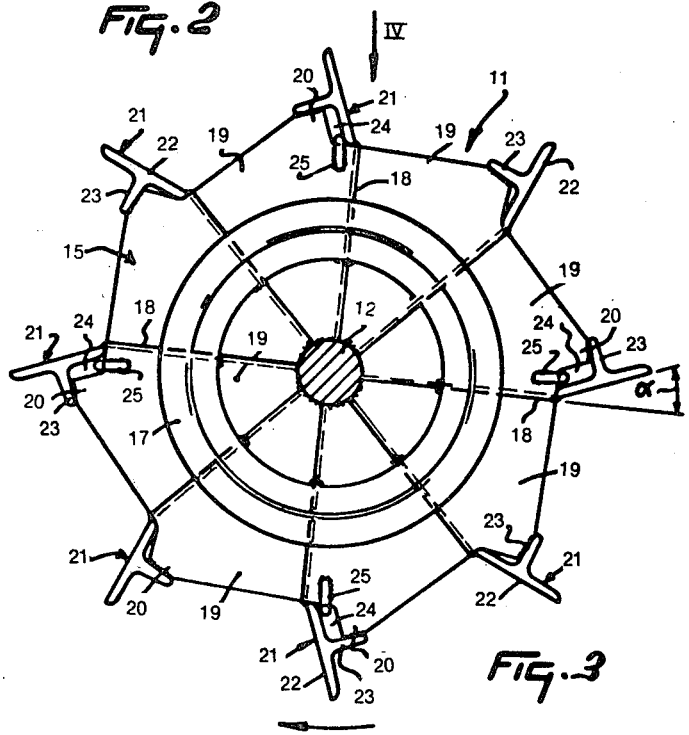
Figure 4:
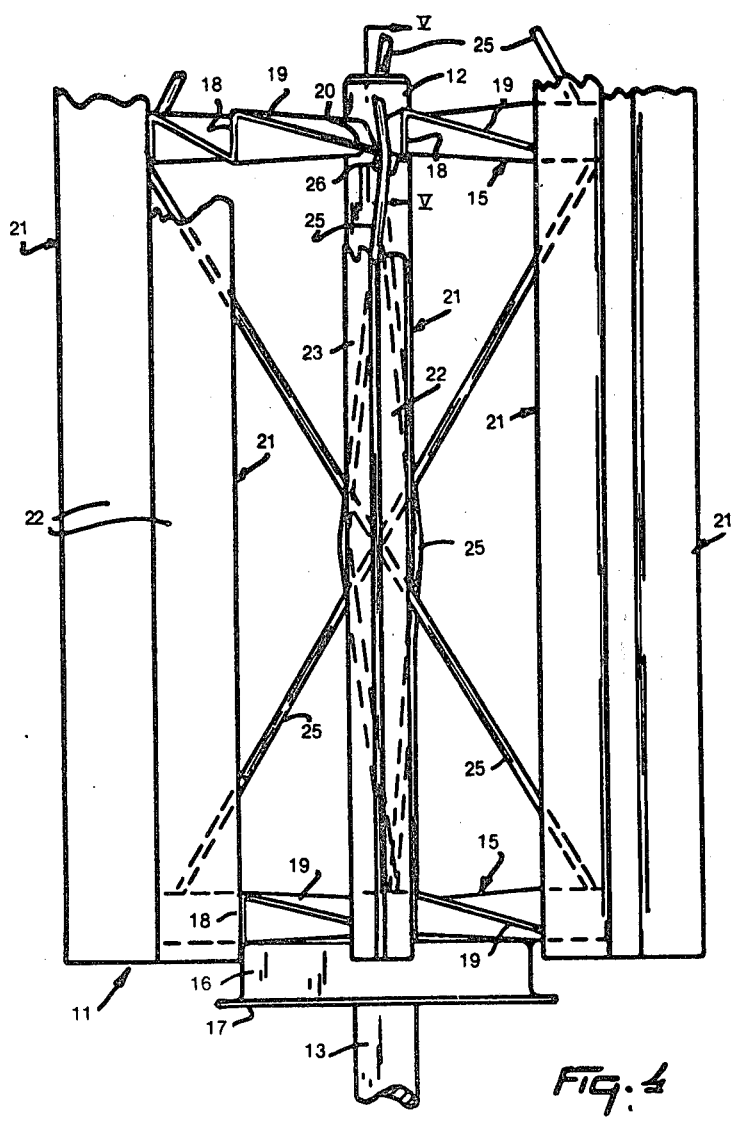
Figure 5:
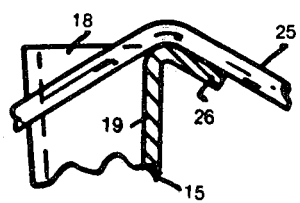
Figure 6:
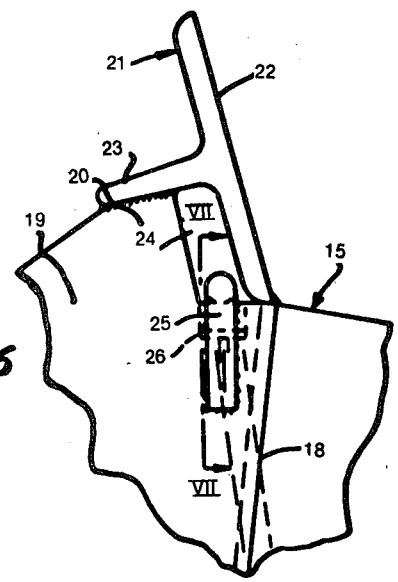
Figure 7:
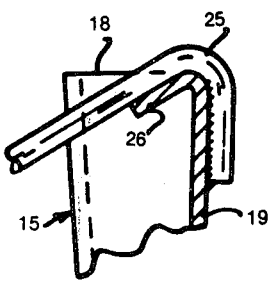
Figure 8:
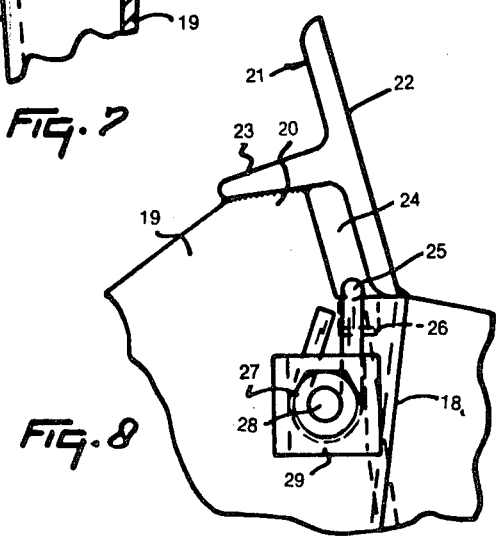

For a better understanding of the invention, and to show how the same may be carried into effect, reference will now be made, by way of example, to the accompanying drawings, in which:

FIG. 1 is a plan view of a soil crumbling roller in accordance with the invention in the form of part of a soil cultivating implement that is connected to the rear of an agricultural tractor, FIG. 2 is a side elevation as seen in the direction indicated by an arrow II in FIG. 1, FIG. 3 is a section, to an enlarged scale, taken on the line III—III in FIG. 1, FIG. 4 is a view as seen in the direction indicated by an arrow IV in FIG. 3, FIG. 5 is a section, to an enlarged scale, taken on the line V—V in FIG. 4, FIG. 6 is an elevation to the same scale as FIG. 5 illustrating one mode of fastening of struts of the roller, FIG. 7 is a section taken on the line VII—VII in FIG. 6, FIG. 8 is a similar elevation to FIG. 6 but illustrates an alternative mode of fastening of the struts, and FIGS. 9 and 10 are similar to FIG. 3 but illustrate two alternative mounting positions that are possible for T-section elements of the roller.

Referring to FIGS. 1 to 7 of the drawings, the soil crumbling roller is illustrated as forming part of a soil cultivating implement and is disposed at the rear of the remainder of that implement with respect to the intended direction of operative travel of both the implement and the roller that is indicated by an arrow A in FIGS. 1 and 2 of the drawings. The soil cultivating implement comprises a hollow box-section frame portion 1 that extends substantially horizontally transverse, and usually substantially horizontally perpendicular, to the direction A, said frame portion 1 rotatably supporting a plurality, such as fourteen, of upwardly extending shafts 2 that are arranged in a single row with their axes of rotation spaced apart from one another at regular intervals which advantageously, but not essentially, have magnitudes of substantially 25 centimeters. The upwardly extending shafts 2 will, as can be seen in FIG. 2 of the drawings, usually be arranged in substantially vertical positions but this, also, is not essential and said shafts 2 may be arranged in significantly inclined relationship with the true vertical. The lowermost ends of the shafts 2 project downwardly from beneath the bottom of the hollow frame portion 1 and each of them is there provided with a corresponding soil working member that is generally indicated by the reference 3. In the embodiment that is illustrated, each soil working member 3 has a pair of diametrically opposed rigid soil working tines 4 that project downwardly into the soil, during operation, from corresponding sleeve-like tine holders that are disposed at the opposite ends of a substantially horizontal support whose center is fastened to the lowermost end of the shaft 2 concerned. Two substantially vertically disposed shield plates 6 are located at short distances beyond the opposite ends of the row of soil working members 3 and each shield plate 6 is connected to pivotal moutings on top of the hollow frame portion 1 by a pair of arms 5. The pivotal mountings of the arms 5 define axes that are substantially horizontally parallel to the direction A and the shield plates 6 can thus turn upwardly and downwardly about the respective axes to match undulations in the surface of the soil over which the implement passes when it is in use, the lower edges of said shield plates 6 being shaped to slide forwardly over the ground in the direction A, or rearwardly with respect to that direction for manoeuvring purposes.

The opposite ends of the hollow frame portion 1 are closed by substantially vertically disposed side plates 7 that are in parallel relationship with each other and parallel or substantially parallel relationship with the direction A, said side plates 7 being extended rearwardly behind the hollow frame portion 1 by short distances. Leading upper regions of the side plates 7 with respect to the direction A carry substantially horizontally aligned pivots 8 about which corresponding arms 9, that extend rearwardly from said pivots 8, are upwardly and downwardly turnable alongside the respective plates 7. The portions of the two side plates 7 that project rearwardly behind the hollow frame portion 1 are formed with curved rows of holes that are so positioned that the centers of curvature of the rows coincide with the axis defined by the pivots 8. Each arm 9 is formed with a single hole at the same distance from the axis defined by the pivots 8 and the holes in the arms 9 can thus be brought into register with chosen ones of the holes in the respective side plates 7 by turning said arms 9 upwardly or downwardly about the pivots 8. Bolts 10 are provided for horizontal entry through the holes in the arms 9 and chosen holes in the plates 7 to retain the arms 9 in corresponding angular positions about the axis defined by the pivots 8.

A soil crumbling roller 11 that is in accordance with the invention is rotatably mounted between downwardly directed rear portions of the two arms 9. To this end, said portions of the arms 9 carry corresponding horizontal bearings 14 in which axial stub shafts 13 at the opposite ends of the roller 11 are freely rotatable. The stub shafts 13 are located at the relatively remote ends of two axially aligned shaft portions 12, the axis defined by said shaft portions 12 being coincident with the longitudinal axis of the roller 11 itself. It is particularly noted that the shaft portions 12 only extend axially through corresponding end regions of the roller 11, there being no central shaft throughout the greater part of the length of the roller 11 that lies between said two end regions. Each shaft portion 12 is entered through central holes in two support plates 15 and is rigidly secured, by welding, to those support plates. The two support plates 15 that correspond to each shaft portion 12 are located close to the inner end of the respective stub shaft 13 and close to the opposite end of the shaft portion 12 concerned that is remote from the stub shaft 13 that has just been mentioned, there being an axial distance of substantially 50 centimeters between the two support plates 15. The support plates 15 that have been discussed are secured to the shaft portions 12 with their general planes in perpendicular relationship with the axis defined by those shaft portions and further support plates 15 that are arranged in the central region of the roller, and that will be referred to below, are also disposed in perpendicular relationship with the substantially horizontal longitudinal axis of the roller 11. The outermost support plates 15 of the roller that are closest to the stub shafts 13 lie alongside, and are secured to, corresponding rings 16, the outer edges of the rings 16 being fastened to corresponding flanges 17 and said flanges 17 being secured, in turn, to the respective stub shaft 13.

FIG. 4 of the drawings shows that each of the support plates 15 has a sawtooth configuration when it is viewed in a direction perpendicular to the longitudinal axis of the roller 11. This sawtooth configuration is obtained by providing eight radial folds 18 whose general planes are in parallel or substantially parallel relationship with the longitudinal axis of the roller 11, oblique portions 19 being arranged to extend between the edges of the radial folds 18 in the manner that can be seen in FIGS. 3 and 4 of the drawings which is such that each oblique portion 19 has a similar angular extent of substantially 45° around the longitudinal axis of the roller 11, it being noted that the widths of the radial folds 18 in a direction parallel to the longitudinal axis of the roller 11 progressively increase radially outwardly away from that axis.

The outermost edge of each oblique portion 19 of each support plate 15 is formed with an outward projection 20 but it will be seen from FIG. 3 of the drawings that, considered around the longitudinal axis of the roller 11, the eight projections 20 that correspond to each plate 15 are alternately of somewhat different shape, each projection 20 being located towards that end of the outer edge of the corresponding oblique portion 19 which is closest to the radial fold 18 that is in advance thereof considered in the intended direction of operative rotation of the roller 11 (see the arrow at the foot of FIG. 3). The radially outermost end of each fold 18 has one end of the crossbar 22 of a corresponding T-section element of the roller that is in the form of a T-section bar 21 welded to it, there thus being eight of the bars 21 which, as can be seen in FIG. 1 of the drawings, extend parallel to one another throughout substantially the whole of the axial length of the roller 11. The upright 23 of each T-section bar 21 has substantially half the length, as seen in cross-section, of the crossbar 22 thereof and one of its sides is fixedly secured by welding to the projection 20 of that oblique portion 19 which is next rearmost with respect to the intended direction of operative rotation of the roller 11 from the radial fold 18 to which one end of the crossbar 22 of the same element or bar 21 is welded. In the embodiment that is being described, the crossbar 22 of each element or bar 21 extends outwardly away from the longitudinal axis of the roller 11 from the end thereof that is secured to one of the folds 18 and is swept back outwardly and rearwardly, with respect to the intended direction of operative rotation of the roller, at an angle α (FIG. 3) to a radial line intersecting the inner end of the crossbar concerned, said angle α advantageously having a magnitude of substantially 20°. As shown in FIG. 3 of the drawings, the radial line which has just been mentioned is coplanar with the respective radial fold 18 for each of the bars 21.

In the embodiment that is being described, each T-section bar 21 is so disposed that the crossbar 22 thereof is directed forwardly with respect to the intended direction of operative rotation of the roller. The eight bars 21 that extend throughout substantially the whole of the axial length of the roller 11 are also secured in the same manner as has been described with reference to FIGS. 3 and 4 of the drawings to the further support plates 15, that were mentioned above, said further support plates 15 being disposed in the central region of the roller at regularly spaced apart intervals of substantially 50 centimeters. The four further support plates may be identical to the support plates 15 that have already been described except that they do not essentially need to be furnished with central holes for co-operation with the shaft portions 12 as do the four support plates 15 that lie in the opposite end regions of the roller. It has already been mentioned that the eight projections 20 of each support plate 15 are alternately of different form around the longitudinal axis of the roller 11 and it can be seen from FIG. 3 of the drawings that four of said projections 20 are so shaped that corresponding spaces 24 are left between the leading edges of those projections 20 with respect to the intended direction of operative rotation of the roller and the crossbars 22 of the elements or bars 21 whose uprights 23 are fastened to those projections. The support plate 15 that is illustrated in FIG. 3 of the drawings is, it will be realised, one of the two outer end support plates of the roller 11 and this support plate has the sharply bent-over ends of four struts 25 entered through the four spaces 24 and welded to the outwardly facing surfaces of the respective four oblique portions 19 near to the corresponding four folds 18 that are immediately in advance of the four spaces 24 with respect to the intended direction of operative rotation of the roller 11.

The four struts 25 whose ends can be seen in FIG. 3 of the drawings extend from the "end" support plate 15 concerned to the substantially symmetrically identical support plate 15 at the opposite end of the roller 11 in the zig-zag configurations that can be seen best in FIGS. 1 and 4 of the drawings. Where the struts 25 of the two opposed pairs thereof cross each other in the end regions of the roller where the two shaft portions 12 are provided, said struts 25 actually bear against the respective shaft portions 12 by way of sharp angular bends (see FIG. 4). In the central region of the roller where there is no axially extending shaft equivalent to the shaft portions 12, the struts 25 merely cross one another at locations substantially coinciding with the longitudinal axis (axis of rotation) of the roller 11. The struts 25 are preferably, but not essentially, in the form of spring steel rods of circular cross-section and they are connected to the "end" support plates 15 and to the "intermediate" support plates 15 in the manner that is shown in detail in FIGS. 4 to 7 inclusive of the drawings. The material of each oblique portion 19 of each support plate 15 that coincides with one of the spaces 24 is bent over to form a steeply inclined lug 26 and, at the "end" support plates 15 where the ends of the struts 25 are welded to those plates, the sharp bends in the struts 25 match the obliquity of the lugs 26 and are welded to the surfaces of the portions 19 that are remote from the sides thereof to which the lugs 26 are bent over (see FIGS. 3, 6 and 7 of the drawings). In the cases of the "intermediate" support plates 15, the struts 25 are merely bent over where they meet the oblique portions 19 so as to bear against the outwardly directed surfaces of the respective lugs 26 (see the top of FIG. 4 of the drawings and FIG. 5).

FIG. 8 illustrates an alternative way of securing the ends of the struts 25 to the "end" support plates 15. In this embodiment, the outer ends of the struts 25 are bent over through a little more than 180° to form loops 27 and each loop 27 is firmly but releasably secured to the outwardly facing surface of the respective oblique portion 19 of the support plate 15 concerned by a clamping plate 29 and a bolt 28 and co-operating nut. If considered necessary, the nut may be of a known kind which is designed to co-operate with its bolt 28 in such a way as strongly to resist the tendency to involuntary loosening that may be caused by vibration during use.

FIG. 9 illustrates an alternative mode of mounting the T-section bars 21 in their appointed positions in the roller 11. The alternately different projections 20 of the support plates 15 are so formed, in this embodiment, that when the crossbars 22 are welded to the outer ends of the folds 18 and the sides of the uprights 23 are welded to the projections 20, the crossbars 22 are swept outwardly and forwardly with respect to the intended direction of operative rotation of the roller 11 (see the arrow at the foot of FIG. 3) at angles to corresponding radial lines that intersect the innermost ends of the respective crossbars 22. When the bars 21 are disposed as shown in FIG. 9 of the drawings, the roller 11 is suitable for operative rotation in either of the two opposite directions that are indicated at the foot of FIG. 9. This facility is due to the fact that the distance between a plane B—B that, as seen in FIG. 9, contains the free end of the upright 23 of one bar 22 and the end of the crossbar 22 of the same bar 21 that is welded to one of the folds 18 is spaced at a constant distance from the general plane of the crossbar 22 of that bar 21 which is next therearound the roller 11. If the direction of operative rotation of the roller of FIGS. 1 to 7 or FIG. 8 of the drawings were to be reversed as compared with the direction indicated by the arrow at the foot of FIG. 3, material might become jammed between the successive T-section bars 21 in a manner which would make it very difficult to remove. The constant distance between the plane B—B and the general plane of the crossbar 22 of the next T-section bar 21 around the circumference of the roller 11 that exists in the embodiment of FIG. 9 of the drawings ensures that material does not get jammed between the bars 21 of the roller of FIG. 9 to an extent which is such that its removal is made difficult as a result of operatively rotating the roller in the opposite direction to that which is indicated in FIG. 3. Reversal of the direction of rotation of the roller of FIG. 9 when used in the implement of FIGS. 1 and 2 is, of course, effected merely by temporarily loosening at least one of the two arms 9, removing the roller 11 and reversing it end-for-end, reconnecting it to the two arms 9 and resecuring the loosened arm 9, or both of them in its or their chosen position(s). Additionally, the roller 11 may be used in circumstances in which it will usually be operatively rotated in the direction indicated in FIG. 3 but may also be frequently operatively rotated for short periods (for example, during maneuvering) in the opposite direction. Under such circumstances, the embodiment of FIG. 9 of the drawings may be preferable to that of FIGS. 1 to 7 or FIG. 8 of the drawings.

FIG. 10 of the drawings illustrates a third embodiment in which the projections 20 are so shaped that, when the bars 21 are secured to the folds 18 and to said projections, the general planes of the crossbars 22 of all of the bars 21 are radially or substantially radially disposed, said crossbars 22 being coplanar or substantially coplanar with the respective folds 18. As indicated by the arrow at the foot of FIG. 10, this embodiment is intended principally for operative rotation in the same direction as the embodiments of FIGS. 1 to 7 and FIG. 8 of the drawings.

Each of the shafts 2 is provided, inside the hollow frame portion 1, with a corresponding straight-toothed or spur-toothed pinion 27A, the sizes of the pinions 27A being such that the teeth of each pinion 27A are in mesh with those of its immediate neighbour, or with those of both of its immediate neighbours, in the single row of pinions. One of the centre pair of shafts 2 in the row has an upward extension through the top of the hollow frame portion 1 into the gear box 28A that is mounted on top of the hollow frame portion 1. Bevel pinions within the gear box 28A place the upward shaft extension in driven connection with a substantially horizontal shaft (not visible) that extends substantially parallel to the direction A. The rearmost end of this substantially horizontal shaft and the rearmost end of an overlying and parallel rotary input shaft of the gear box 28A are both extended through the rear wall of that gear box into a change-speed gear 29A that is mounted at the back of the gear box. The parallel and spaced shaft ends that project into the change-speed gear 29A are splined for the exchangeable and interchangeable reception of co-operating pairs of straight-toothed or spur-toothed pinions that are of different sizes. The particular pair of pinions that is chosen, and the arrangement thereof that is adopted in the change-speed gear 29A, dictates the transmission ratio between the rotary input shaft of the gear box 28A and the shafts 2 and thus the speed at which all of the shafts 2 and their soil working members 3 will be driven in response to a substantially constant input speed of rotation applied to the input shaft of the gear box. The rotary input shaft of the gear box 28A projects forwardly from the front thereof in substantially the direction A and is there splined to enable it to be placed in driven connection with the rear power rake-off shaft of an agricultural tractor or other operating vehicle (as shown in outline in FIGS. 1 and 2 of the drawings) through the intermediary of a telescopic transmission shaft that is of a construction which is known per se having universal joints at its opposite ends. The front of the hollow frame portion 1 with respect to the direction A is provided with a coupling member or trestle 30 which is of substantially triangular configuration as seen in front or rear elevation. The coupling member or trestle 30 is constructed and arranged for connection to the rear three-point lifting device or hitch of the same agricultural tractor or other vehicle which drives the soil working members 3 and locations towards its apex are rigidly connected by down-wardly and rearwardly divergent tie beams 31 to locations at the top and rear of the hollow frame portion 1, said locations being well spaced apart from one another in a horizontal direction that is perpendicular to the direction A. The tie beams 31 strengthen the connection of the coupling member or trestle 30 to the hollow frame portion 1.

In the use of the soil cultivating implement of FIGS. 1 and 2 of the drawings, its coupling member or trestle 30 is connected to the three-point lifting device or hitch at the rear of an agricultural tractor or other operating vehicle and the forwardly projecting rotary input shaft of its gear box 28A is placed in driven connection with the power take-off shaft at the rear of the same tractor or other vehicle by way of the known intermediate telescopic transmission shaft that has been referred to above which has universal joints at its opposite ends. The speed at which the soil working members 3 will revolve in response to a substantially constant input speed of rotation applied to the input shaft of the gear box 28A is adjusted (if required), before work commences, by making an appropriate choice of pinions, and their arrangement, in the change-speed gear 29A. Moreover, the maximum depth to which the tines 4 of the rotary soil working members 3 can penetrate into the soil is adjusted, before work commences, by turning the arms 9 upwardly or downwardly, as necessary, about the axis defined by the pivots 8 to lower or raise the level of the axis of rotation of the roller 11 relative to the level of the frame portion 1 of the implement, the bolts 10 being used to maintain the chosen setting. These adjustments are made principally having regard to the nature and condition of the soil that is to be cultivated and the purpose for which that soil is required after cultivation. It will be realized that, in the implement of FIGS. 1 and 2 of the drawings, the roller 11 serves a depth control function for the soil working members 3 in addition to its primary function of crumbling and crushing lumps of earth that are left at and near to the ground surface by the immediately foregoing tines 4. The roller 11 also levels the ground surface to some extent.

Due to the described arrangement of the pinions 27A inside the hollow frame portion 1, each soil working member 3 revolves around the axis of the corresponding shaft 2 in the opposite direction to the direction of rotation of its immediate neighbour or both of its immediate neighbours as is indicated by small arrows in FIG. 1 of the drawings. Each soil working member 3 has an effective working width which is a little greater than the regular spacing (preferably, substantially 25 centimeters) between the axes of rotation of the shafts 2 and therefore the fourteen, in this embodiment, soil working members cultivate individual strips of land that extend in the direction A but that overlap one another to produce, in effect, a single broad strip of worked soil having a width of substantially 3.5 meters. The soil that is displaced by the tines 4 tends to be moved rearwardly to a larger extent between the neighbouring members 3 where their tines move rearwardly with respect to the direction A rather than between the pairs of soil working members 3 where their tines move forwardly with respect to the direction A (see FIG. 1) and it will be noted that, viewed in the direction A, the support plates 15 of the roller 11 register with the latter regions of overlap between immediately neighbouring pairs of the members 3 rather than with the former regions of overlap so that the greater part of the rearwardly displaced soil is contacted by the roller 11 between its support plates 15 rather than at locations in register with those support plates. In the embodiment of FIGS. 1 to 7 of the drawings, the roller 11 is intended to revolve in the direction that is indicated by an arrow at the foot of FIG. 3 so that the outwardly and rearwardly swept back crossbars 22 of the elements or bars 21 are in advance of the uprights 23 thereof with respect to that direction of rotation. The downwardly and outwardly projecting rib-like portions of the crossbars 22 are very effective in crumbling lumps of soil because such lumps tend to be pressed into the angular recess between the outwardly directed portion of each crossbar 22 and the corresponding upright 23, it being noted that said uprights 23 are substantially tangential to an imaginary circular cylindrical figure whose axis of rotation coincides with the longitudinal axis of the roller 11. Known soil crumbling rollers that are not in accordance with the invention tend to suffer from the disadvantage that, if their axial lengths are increased to match a large working width such as the substantially 3.5 meter working width of the implement of FIGS. 1 and 2 of the drawings, the rigidity becomes inadequate and somewhat complicated measures have to be taken to bring the rigidity up to an acceptable level. Unfortunately, the known measures that have been adopted tend, in many cases, adversely to affect the loosening and crumbling efficiency of the known rollers particularly when they are used on wet and/or heavy soil. The use of the T-section elements that have been described for rollers in accordance with the present invention permits such rollers to have entirely adequate rigidity despite a large axial length, it being unneccessary to provide a central shaft or other central support throughout the whole of the axial ength of the roller. A roller in accordance with the invention has a high resistance to torsional deformation and this is partly due to the provision of the four spring steel or other struts 25, the described arrangement of the struts 25 not only improving the resistance to torsional deformation of the roller 11 but also the elasticity of the roller which latter should not be confused with inadequate rigidity. The outwardly directed limbs or portions of the crossbars 22 ensure that the roller 11 has a good resistance to becoming filled with mud, lumps of wet soil, turfs and the like which can occur somewhat easily with some known soil crumbling rollers, particularly when they are used on wet and/or heavy soil.

If it is desirable that the roller 11 should operate satisfactorily when operatively rotated about its longitudinal axis in either of the two possible directions, then it is desirable, although not absolutely essential, to employ the embodiment that has been described with reference to FIG. 9 of the drawings. The constant distance between each plane B-B and the general plane of the crossbar 22 of the next T-section element or bar 21 that has been described above ensures that a non-convergent opening exists for any material entering the roller between the bars 21 so that the danger of jamming of such material is greatly reduced and any temporarily adhering material can be shed from the roller without much difficulty.

The use of the embodiment that has been described with reference to FIG. 10 of the drawings is to be preferred when a greater penetration of the outwardly directed portions of the crossbars 22 into the soil is required because, with the embodiment of FIG. 10 of the drawings, said portions of the crossbars 22 are substantially radially orientated with respect to the axis of rotation of the roller 11 and can thus be pressed into the soil at substantially optimum efficiency.

The various embodiments of the soil crumbling roller 11 that have been described enable a roller of increased axial length to be furnished without the rigidity thereof falling below an acceptable level. The resistance to torsional deformation is particularly marked in a roller in accordance with the invention and such a roller will function well even on wet and/or heavy soil. The roller can have any one of the different constructions that has been described having regard to the particular soil crumbling work which it is to undertake and, provided that a correct choice is made, the roller will function well without the adherence of any significant quantities of soil for any length of time even when it is used under somewhat adverse working conditions. The use of the support plates 15 that have been described and that are illustrated in the accompanying drawings also enhances the rigidity of the whole roller 11 and the T-section bars 21 can be secured quickly and easily to those plates 15. In addition to significantly increasing the resistance to torsional deformation of the roller 11, the struts 25 are important during the initial construction of the roller. When constructing a roller in accordance with the invention, the method employed advantageously involves using the struts 25 to provide initial connections between the support plates 15 that are spaced apart from one another at regular intervals of substantially 50 centimeters. Thus, the struts 25, which are already bent to shape, loosely contact the "intermediate" support plates 15 that lie between the support plates that are secured to the shaft portions 12, the initial loose connections being rendered more permanent when the T-section bars are subsequently welded to the various support plates 15.

It is noted that the described rollers 11, which have axial lengths of substantially 3½ meters, are only examples of rollers that can be constructed in accordance with the invention. Such rollers may, if required, be of shorter axial length or may even have axial lengths that are greater than substantially 3.5 meters. It is also noted that, while the roller embodiments that have been described and that are illustrated in the accompanying drawings form a part of a soil cultivating implement, this is by no means essential. Rollers in accordance with the invention may form parts of other agricultural implements or machines that are not necessarily employed in soil cultivation and may, of course be used entirely separately, in their own right, as soil crumbling implements, all that is necessary in this latter event is to provide a simple frame by which arms equivalent to the arms 9 can be connected to a lifting device or hitch, tow hook, tow bar or the like on an agricultural tractor or other operating vehicle.

Although various features of the soil crumbling rollers that have been described and/or that are illustrated in the accompanying drawings will be set forth in the following claims as inventive features, it is emphasised that the invention is not necessarily limited to those features and that it includes within its scope each of the parts of each soil crumbling roller embodiment that has been described, and/or that is illustrated in the accompanying drawings, both individually and in various combinations.

What we claim is:

1. A soil crumbling roller comprising an elongated member having an axis of rotation and an outer periphery spaced from said axis, said periphery comprising supporting plates that mount elongated, soil-contacting elements and said elements extending in the same general direction as the axis of rotation, said elements being fastened to said plates and said plates being positioned at spaced apart intervals along the length of the axis of rotation of said roller, said plates having edge projections that comprise fastening sites for said elements and each plate having a sawtooth configuration when viewed from the side, shorter edges of the teeth comprising radial folds of the plate and oblique portions interconnecting said folds, said elements being fastened to respective projections and the latter being spaced from said folds.

2. A roller as claimed in claim 1, wherein said oblique portions have substantially the same angular extent relative to the axis of roller rotation, said elements being T-shaped bars and each bar being fastened to a corresponding fold and to a respective projection, said projections being outer extensions of said oblique portions.

3. A roller as claimed in claim 1, wherein a plurality of struts are secured inside the circumference of the roller and said struts are fastened to the supporting plates.

4. A roller as claimed in claim 1, wherein said elements are T-shaped in cross section and the crossbar and the upright of each T-shaped element are dissimilar in length.

5. A roller as claimed in claim 4, wherein at least some of said elements are T-shaped in cross section and the crossbars thereof are swept back outwardly and rearwardly, with respect to the intended direction of operative rotation of said roller.

6. A roller as claimed in claim 4, wherein at least some of said elements are T-shaped in cross section and a neighboring pair of the T-shaped elements are mounted so that a plane containing connection points of one of the elements to the roller is substantially parallel to the general plane of the crossbar of the other element of said pair.

7. A soil crumbling roller comprising an elongated member having an axis of rotation and an outer periphery spaced from said axis, said periphery comprising elongated soil-contacting bars that extend in the same general direction as the axis of rotation, said bars being fastened to supporting plates and said plates being positioned along the length of the axis of rotation of said roller at spaced apart intervals, said plates having outer projections that afford fastening sites for said bars, each plate having a sawtooth configuration as seen from the side, radial folds in the plate corresponding to teeth edges and obliquely angled portions that interconnect said folds, each bar being T-shaped in cross section with a crossbar and an upright, said crossbar being fastened to one of said folds and said upright to one of said projections.

8. A roller as claimed in claim 7, wherein said crossbar is greater in length than said upright and the crossbars of said elements extend outwardly away from the axis of rotation, the uprights of said elements extending tangential to a cylinder centered on said axis of rotation.

9. A roller as claimed in claim 8, wherein said projections are the outer edges of said obliquely angled portions, spaces being formed between alternate projections and the crossbars of the corresponding bars connected to those projections.

10. A roller as claimed in claim 9, wherein internal struts interconnect the spaces of successive plates and extend in a zig-zag configuration, said struts contacting said plates at the outer peripheries thereof.

11. A roller as claimed in claim 10, wherein the opposite ends of the roller have corresponding axial shaft portions, each shaft portion carrying two spaced apart plates and struts extending between said two plates to bear against the respective shaft portion with sharp angular bands.

12. A roller as claimed in claim 10, wherein each strut is fastened only to outer plates located at opposite lateral ends of said roller, said struts bearing against intermediate plates.

13. A roller as claimed in claim 9, wherein the projections of each plate are of alternately different shape around the axis of rotation of said roller and said projections are spaced at different distances from neighboring folds.

14. A roller as claimed in claim 13, wherein spaces are formed in each plate between each alternate projection around the axis of rotation of said roller and the crossbar of a neighboring element of T-shaped cross section, struts extending through said spaces.

15. A roller as claimed in claim 7, wherein the crossbars of said elements are inclined at acute angles to radial lines that intersect the fastening regions of said crossbar.

* * * * *